US011785928B2

(12) United States Patent
Pulkrabek et al.

(10) Patent No.: US 11,785,928 B2
(45) Date of Patent: Oct. 17, 2023

(54) BAITCASTER WITH COMPOUND GEAR SET

(71) Applicant: TrikaUSA Inc., Superior, WI (US)

(72) Inventors: Larry Pulkrabek, Superior, WI (US); Ty Warner, Superior, WI (US); Danny Uribe, Superior, WI (US); Ron Hedberg, Superior, WI (US)

(73) Assignee: TRIKAUSA INC., Superior, WI (US)

( * ) Notice: Subject to any disclaimer, the term of this patent is extended or adjusted under 35 U.S.C. 154(b) by 306 days.

(21) Appl. No.: 17/073,137

(22) Filed: Oct. 16, 2020

(65) Prior Publication Data

US 2021/0112799 A1   Apr. 22, 2021

Related U.S. Application Data

(60) Provisional application No. 62/916,439, filed on Oct. 17, 2019.

(51) Int. Cl.
| *A01K 89/015* | (2006.01) |
| *F16H 1/36* | (2006.01) |
| *F16H 55/17* | (2006.01) |
| *F16H 55/08* | (2006.01) |

(52) U.S. Cl.
CPC .......... *A01K 89/0183* (2015.05); *F16H 1/36* (2013.01); *F16H 55/08* (2013.01); *F16H 55/17* (2013.01); *F16H 2055/176* (2013.01)

(58) Field of Classification Search
CPC ............ A01K 89/0183; A01K 89/0184; A01K 89/0186; A01K 89/01902; A01K 89/01931; A01K 89/015; A01K 89/033; F16H 1/36; F16H 55/17

USPC ............... 242/227, 255, 261, 267, 268, 298; 475/339

See application file for complete search history.

(56) References Cited

U.S. PATENT DOCUMENTS

| 2,487,387 | A | * | 11/1949 | Sears et al. .......... | A01K 89/015 |
| | | | | | 242/255 |
| 2,503,366 | A | | 4/1950 | Weckel | |
| 4,927,095 | A | * | 5/1990 | Young .................. | A01K 89/015 |
| | | | | | 242/261 |
| 5,560,562 | A | * | 10/1996 | Hartmann ............ | A01K 89/015 |
| | | | | | 242/255 |

(Continued)

FOREIGN PATENT DOCUMENTS

| DE | 38 07 468 A1 | 9/1989 | |
| DE | 3807468 A1 * | 9/1989 | ............ A01K 89/033 |
| TW | 201709815 A * | 3/2017 | ............ A01K 89/033 |

OTHER PUBLICATIONS

International Search Report and Written Opinion in PCT/US2020/056141, dated Jan. 13, 2021 (9 pages).

*Primary Examiner* — Michael R Mansen
*Assistant Examiner* — Henrix Soto
(74) *Attorney, Agent, or Firm* — Foley & Lardner LLP

(57) ABSTRACT

A baitcaster for retrieving a fishing line includes a spool, and a compound gear set. The spool is configured to be driven to take up the fishing line. The compound gear set includes a ring gear, first planet gears, second planet gears, and a second shaft. The ring gear is configured to receive an input torque from a first shaft. The first planet gears are driven by the ring gear. The second planet gears are driven by the first planet gears. The second shaft is driven by the second planet gears and is configured to drive the spool to take up the fishing line.

20 Claims, 14 Drawing Sheets

(56) References Cited

U.S. PATENT DOCUMENTS

| | | | |
|---|---|---|---|
| 5,759,130 A * | 6/1998 | Woytaszek | F16H 1/36 |
| | | | 475/339 |
| 6,446,894 B1 | 9/2002 | Holma et al. | |
| 2010/0059615 A1* | 3/2010 | Lombardo et al. | A01K 89/06 |
| | | | 242/229 |
| 2012/0318902 A1* | 12/2012 | Kawabe | A01K 89/02 |
| | | | 242/298 |

* cited by examiner

BAITCASTER WITH COMPOUND GEAR SET

CROSS-REFERENCE TO RELATED PATENT APPLICATION

The present application claims the benefit of and priority to U.S. Provisional Application. No. 62/916,439, filed Oct. 17, 2019, the entire disclosure of which is incorporated by reference herein.

BACKGROUND

The present disclosure relates generally to fishing reels. More particularly, the present disclosure relates to baitcasting fishing reels.

SUMMARY

At least one embodiment of the present disclosure relates to a baitcaster for retrieving a fishing line. The baitcaster includes a spool, and a compound gear set. The spool is configured to be driven to take up the fishing line. The compound gear set includes a ring gear, first planet gears, second planet gears, and a second shaft. The ring gear is configured to receive a torque from a first shaft. The first planet gears are driven by the ring gear. The second planet gears are driven by the second planet gears. The second shaft is driven by the second planet gears and is configured to drive the spool to take up the fishing line.

Another embodiment of the present disclosure relates to a compound gear set for a fishing reel. The compound gear set includes a ring gear, input planet gears, output planet gears, and an output shaft. The ring gear is configured to receive an input torque from an input shaft. The input planet gears are driven by the ring gear. The output planet gears are driven by the input planet gears. The output shaft is driven by the output planet gears and configured to drive a spool to take up the fishing line.

Another embodiment of the present disclosure relates to a gear set for a baitcaster. The gear set includes an input shaft, planet gear shafts, input planet gears, and output planet gears. The input shaft is configured to be driven by a handle about a shaft axis. The planet gear shafts are radially offset from the shaft axis, each define an axis, and are configured to be driven to rotate about the axis. Each of the input planet gears are fixedly coupled with a corresponding one of the plurality of planet gear shafts. The input planet gears are configured to be driven to rotate by the input shaft. Each of the output planet gears are fixedly coupled with a corresponding one of the planet gear shafts. The output planet gears are configured to drive an output shaft of the baitcaster.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

Referring generally to the FIGURES, a fishing reel includes an elongated member or a fishing rod and a baitcaster apparatus. The baitcaster apparatus is fixedly coupled with the fishing rod and is configured to receive a torque input from a user to retrieve or take-up fishing line that extends along the fishing rod. The fishing line may extend through one or more eyelets that are positioned along the fishing rod and guide the fishing line towards the baitcaster apparatus for winding or take-up onto the spool.

The baitcaster apparatus may include body members and structural members. The body members may be spaced apart and cooperatively define an inner volume in which a spool drive mechanism is disposed. The spool drive mechanism can include a compound gear set. The compound gear set includes an input shaft that is configured to receive an input torque from the user through a handle. The input shaft may be fixedly rotatably coupled with a ring gear that includes radially inwards facing teeth. The radially inwards facing teeth are configured to engage multiple input planetary gears. The input planetary gears can each be fixedly coupled with planetary gear shafts that fixedly couple with output planetary gears. The input planetary gears, the planetary gear shafts, and the output planetary gears may be integrally formed with each other and can be supported by a carrier. The carrier may be rotatably fixedly coupled with a body or housing member of the baitcaster apparatus. The input planetary gears, the planetary gear shafts, and the output planetary gears may spin without orbiting about the input shaft.

The output planetary gears are configured to engage and drive an output shaft that extends along a same axis as the input shaft. The output shaft can be rotatably fixedly coupled with the spool to drive the spool to take up or let out the fishing line.

The spool drive mechanism can include a one-way bearing that is rotatably fixedly coupled with the input shaft. The one-way bearing may facilitate or allow rotation of the input shaft in a first direction (e.g., a take-up direction) but prevent rotation of the input shaft in a second, opposite, direction (e.g., a let-out direction). In some embodiments, the spool is selectively rotatably coupled with the input shaft so that the spool can be driven by the input shaft for winding the fishing line and free to rotate for letting out the fishing line.

Baitcaster

Figure 1:
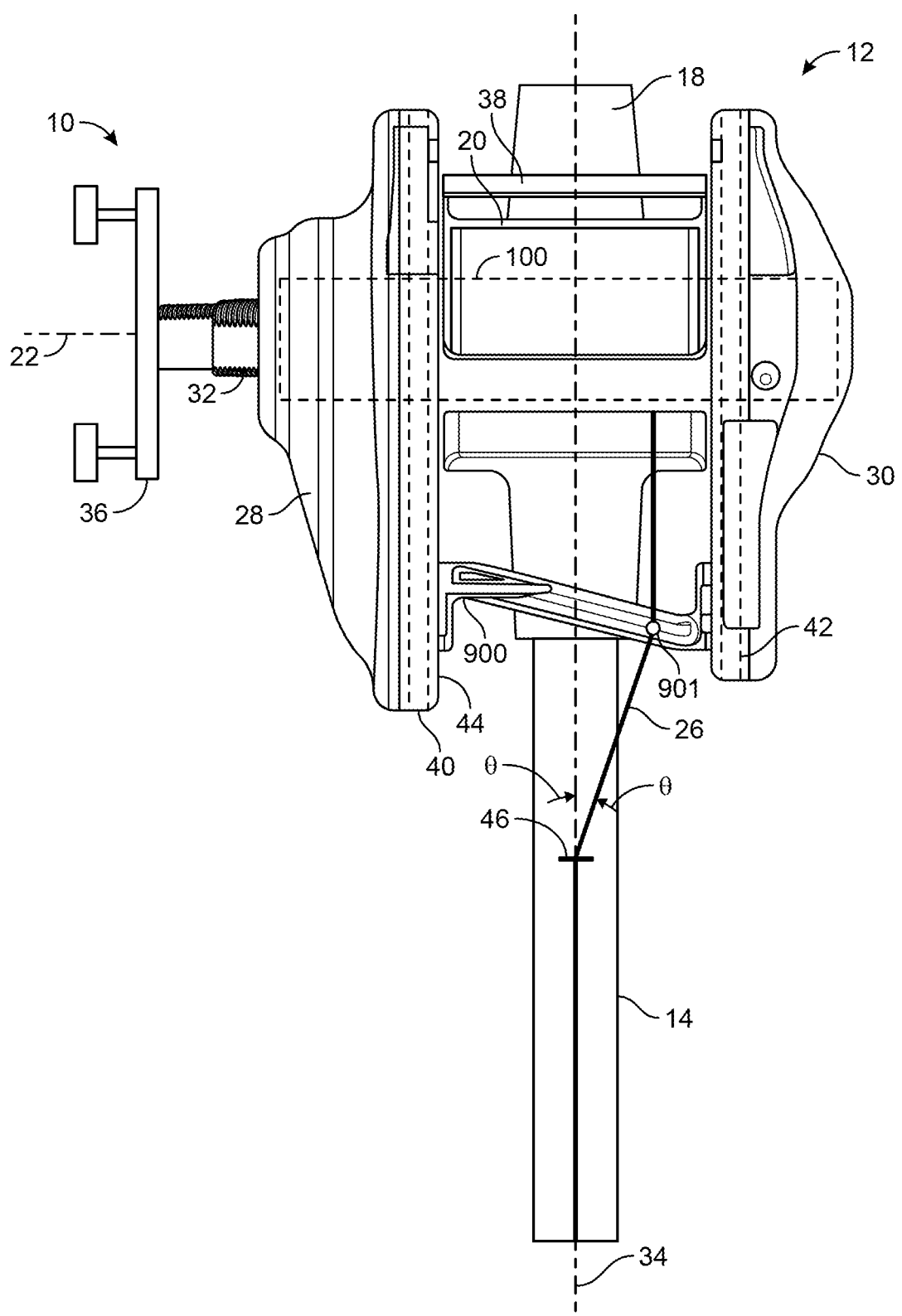
FIG. 1 is a top view of a baitcaster, according to an exemplary embodiment.
Figure 2:
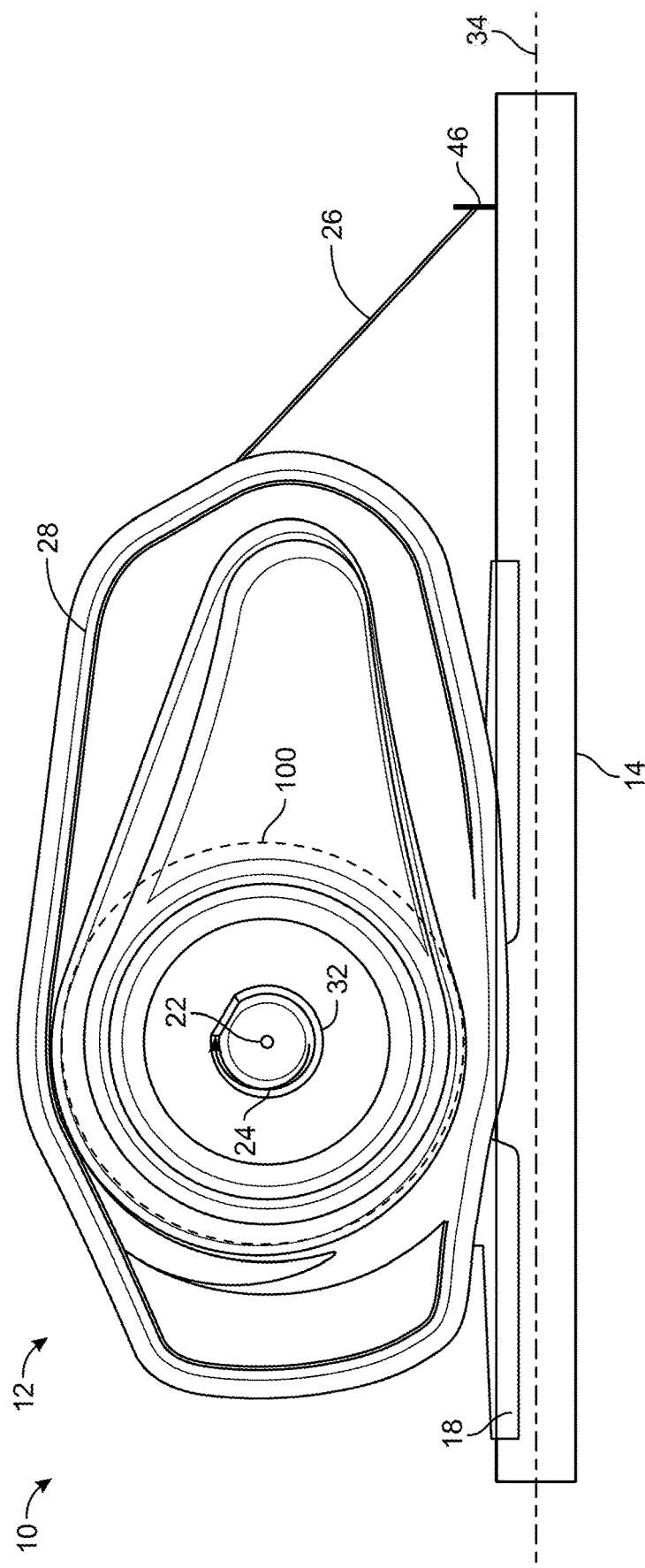
FIG. 2 is a side view of the baitcaster of FIG. 1, according to an exemplary embodiment.
Figure 3:
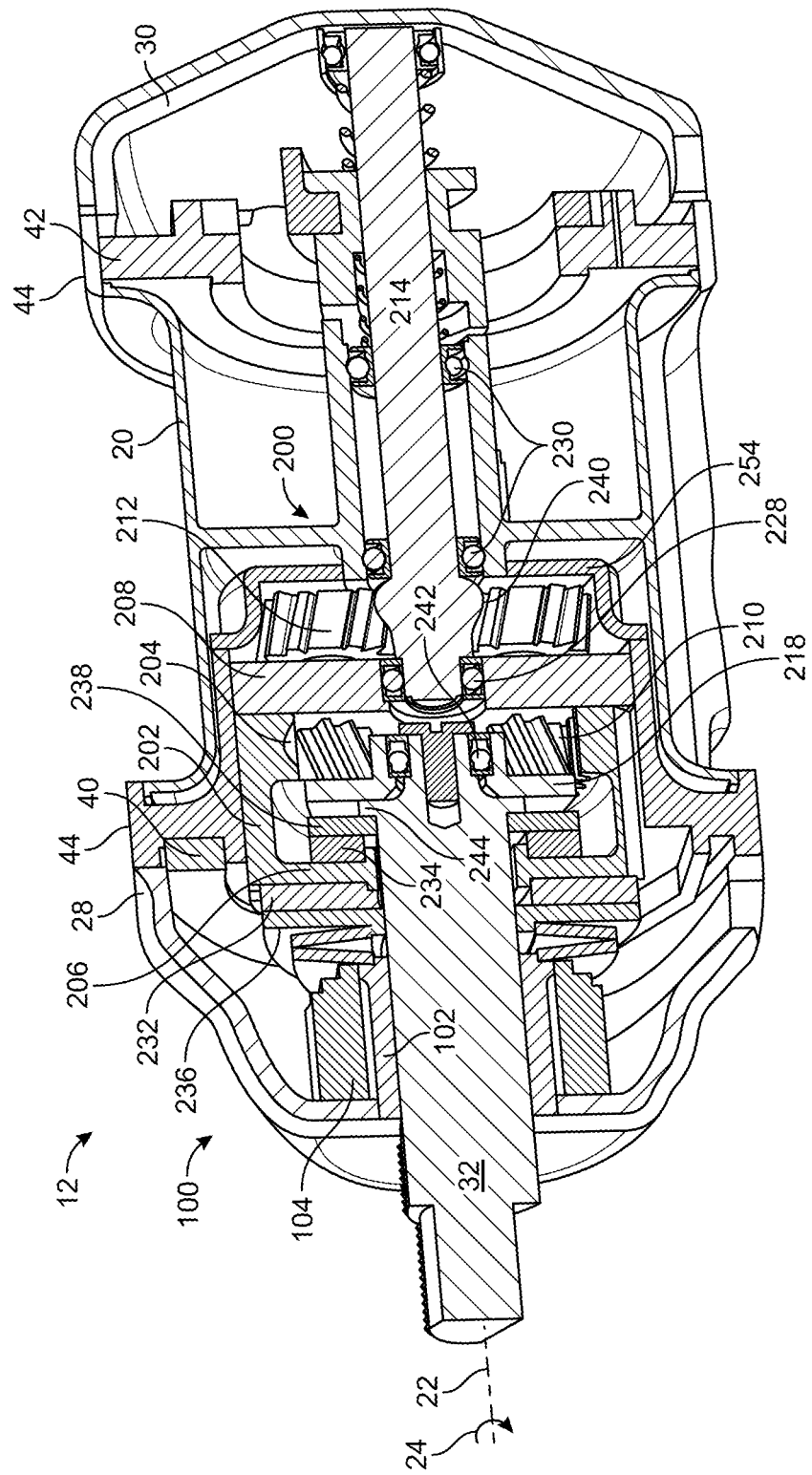
FIG. 3 is a sectional view of the baitcaster of FIG. 1 including a spool drive mechanism, according to an exemplary embodiment.

Referring particularly to FIGS. 1-3, a fishing reel, a baitcasting reel, a baitcaster, etc., shown as fishing reel 12 includes a rod, a pole, an elongated member, a flexible member, etc., shown as rod 14 and a reel apparatus, a reel mechanism, a reel assembly, a fishing line retrieval apparatus, etc., shown as reel 12. Reel 12 is fixedly coupled, attached, mounted, etc., with rod 14. In some embodiments, reel 12 is fixedly coupled with rod 14 through mounts, attachment members, etc., shown as mount 18. Mount 18 may extend from a bottom portion of reel 12 and fixedly couple with rod 14.

Reel 12 includes a spool, a barrel, a cylindrical member, etc., shown as spool 20. Spool 20 may be rotatably coupled with an input shaft, a rotatable shaft, a shaft, etc., shown as input shaft 32 such that spool 20 rotates when input shaft 32 is turned. In some embodiments, input shaft 32 is rotatably or fixedly coupled with a handle 36. An axis 22 (e.g., a shaft axis, a central axis, a longitudinal axis, etc.) extends through input shaft 32 and spool 20. Input shaft 32 and spool 20 can be co-axial with each other about axis 22. Handle 36 facilitates an input torque to input shaft 32 about axis 22 for driving spool 20. In some embodiments, handle 36 and input shaft 32 are configured to rotate in a first direction (e.g., direction 24) to take-up fishing line 26 so that fishing line 26 is wound onto spool 20.

Fishing line 26 can extend along rod 14 and may be guided by one or more eyelets 46. Eyelets 46 can be positioned along rod 14 and can include an opening, a hole, an aperture, etc., through which fishing line 26 passes. Fishing line 26 may extend from an eyelet 46 that is most proximate reel 12 onto spool 20. Rod 14 defines a central axis 34 that extends longitudinally through a center of rod 14. Fishing line 26 may be guided from eyelet 46 that is most proximate reel 12 to spool 20. Fishing line 26 that is between the eyelet 46 most proximate reel 12 and central axis 34 may define an angle θ. The angle θ may change from a maximum positive value $θ_{+,max}$ to a maximum negative value $θ_{-,max}$ as fishing line 26 is taken up or reeled onto spool 20.

Reel 12 includes a first or a handle-side body member, housing member, structural member, etc., shown as first body member 28, and a second body member, housing member, structural member, etc., shown as second body member 30. First body member 28 and second body member 30 can define opposite sides of reel 12. Spool 20 can be positioned between first body member 28 and second body member 30 and may extend between first body member 28 and second body member 30. Spool 20 can be supported or rotatably coupled on either end with first body member 28 and second body member 30. Spool 20 may rotate relative to first body member 28 and second body member 30.

Reel 12 includes a guide member 900 that is configured to extend between first body member 28 and second body member 30 and be driven to rotate by rotation of handle 36. In some embodiments, guide member 900 is configured to engage fishing line 26 at a contact point 901. Fishing line 26 may be guided onto spool 20 from contact point 901. For example, fishing line 26 may extend from contact point 901 onto spool 20 where it is then wound onto spool 20. Rotation of guide member 900 can result in reciprocating translation of contact point 901. For example, as guide member 900 rotates, contact point 901 may shift back and forth along guide member 900 between opposite ends of guide member 900. In this way, fishing line 26 is guided and wound onto spool 20 along an entire longitudinal length of spool 20, thereby facilitating an even distribution of fishing line 26 on spool 20 and reducing knotting and/or bunching of fishing line 26 on spool 20 (e.g., an uneven distribution of fishing line 26). Evenly distributing and winding fishing line 26 on spool 20 can reduce a likelihood of fishing line 26 snagging, knotting, or becoming tangled when fishing line 26 is let out (e.g., released) from spool 20 (e.g., for casting operations).

Referring still to FIGS. 1-2, input shaft 32 extends through first body member 28 and protrudes outwards from first body member 28. Handle 36 is coupled with input shaft 32 exterior of first body member 28 so that handle 36 can be operated by a fisherman's right hand while rod 14 is held by the fisherman's left hand. In other embodiments, input shaft 32 extends outwards through second body member 30 so that handle 36 is operated by the fisherman's left hand while rod 14 is held by the fisherman's right hand.

Input shaft 32 is configured to turn and drive rotation of spool 20 through a spool drive mechanism, a compound planetary gear assembly, a gear train, a gear assembly, etc., shown as spool drive mechanism 100. Spool drive mechanism 100 can be configured to receive torque from input shaft 32 and transfer the torque to spool 20 so that spool 20 rotates to take up or wind fishing line 26 onto spool 20.

Referring particularly to FIG. 1, reel 12 includes an input member, a bar, a rotatable linkage, a translatable member, a lever, a button, etc., shown as lever 38. Lever 38 may extend between first body member 28 and second body member 30 and may be pivotable, rotatable, and/or translatable between a first position and a second position. In some embodiments, lever 38 is configured to be transitioned between the first position and the second position to selectively couple input shaft 32 with spool 20.

Referring still to FIG. 1, reel 12 can include a first structural member, a first frame member, etc., shown as first frame member 40, and a second structural member, a second frame member, etc., shown as second frame member 42. First frame member 40 and second frame member 42 can be parallel with each other and may both extend in a longitudinal direction that is defined by central axis 34. First frame member 40 and second frame member 42 may be positioned within first body member 28 and second body member 30, respectively or may be positioned within an inner volume that is at least partially defined by first body member 28 and second body member 30.

Referring still to FIG. 1, reel 12 can include a central body member, a central housing, etc., shown as body member 44. In some embodiments, body member 44 extends between first body member 28 and second body member 30. First body member 28 and body member 44 may cooperatively define a first inner volume in which first structural member 40 is positioned. Second body member 30 and body member 44 may cooperatively define a second inner volume in which second structural member 42 is positioned.

Spool Drive Mechanism

Compound Planetary Gear Set

Referring particularly to FIGS. 3-14, spool drive mechanism 100 includes a planetary gear set, a planetary gear train, a compound planetary gear set, etc., shown as compound gear set 200. Compound gear set 200 may include input shaft 32 or may be driven by input shaft 32. For example, turning input shaft 32 may drive compound gear set 200 of spool drive mechanism 100, thereby driving rotation of spool 20.

Reel 12 also includes a second structural member, a left structural member, a frame member, etc., shown as second structural member 42. First structural member 40 and second structural member 42 can be parallel with each other and may be positioned apart. Input shaft 32 may extend through first structural member 40. In some embodiments, first body member 28 and second body member 30 are fixedly coupled with first structural member 40 and second structural member 42.

Referring particularly to FIGS. 1, 6-9, and 13-14, compound gear set 200 includes a ring member 202 that is configured to be driven to rotate by turning of input shaft 32. Ring member 202 can be centered or co-axial with axis 22 can may be configured to rotate about axis 22. Ring member 202 can include a ring gear portion 204 and an engagement portion 206. In some embodiments, ring gear portion 204 includes radially inwards facing teeth that are configured to engage or mesh with corresponding teeth, gears, planet gears, etc., of compound gear set 200. Engagement portion 206 can be selectably or adjustably fixedly coupled with input shaft 32. For example, engagement portion 206 may be fixedly rotatably coupled with input shaft 32 through a frictional interface. The frictional interface may be adjustable (e.g., by a user input, by twisting a knob, etc.) to increase or decrease a strength of the frictional interface.

Compound gear set 200 also includes a carrier 208, multiple planet gear shafts 216, input planet gears 210 (e.g., first planet gears), output planet gears 212 (e.g., second planet gears), and an output shaft 214. In some embodiments, ring member 202 includes radially inwards facing teeth that are configured to engage input planet gears 210. Input planet gears 210 are each rotatably or fixedly coupled with a corresponding one of planet gear shafts 216. Planet gear shafts 216 may each extend through and rotatably couple with an inner race of a corresponding planet gear bearing 224. An outer race of planet gear bearings 224 is fixedly coupled with carrier 208. For example, planet gear bearings 224 may be press fit into an aperture, an opening, a hole, a bore, etc., of carrier 208, shown as aperture 226. Carrier 208 can include multiple apertures 226 that are positioned a radial distance away from axis 22 and are evenly angularly spaced about axis 22. For example, compound gear set 200 can include three sets of a planet gear bearing 224, an input planet gear 210, an output planet gear 212, and a planet gear shaft 216. Output planet gears 212 may be positioned within an inner housing member, an inner shell member, an inner body member, etc., shown as inner body member 254. Inner body member 254 can extend between opposite portions of body member 44.

Planet gear bearings 224 are press fit, slip fit, or otherwise fixedly coupled along an outer race with apertures 226 (or an inner surface of carrier 208 that is defined by apertures 226). Planet gear shafts 216, input planet gears 210, and output planet gears 212 can be rotatably coupled with carrier 208 through planet gear bearings 224 so that planet gear shafts 216, input planet gears 210, and output planet gears 212 can spin relative to carrier 208 about their respective axes 220 (shown in FIG. 5). Planet gear shaft 216, input planet gear 210, and output planet gear 212 may be fixedly or rotatably coupled with each other (e.g., integrally formed) so that each set of planet gear shaft 216, input planet gear 210, and output planet gear 212 spin in unison about its respective axis 220. Axis 220 extends through each planet gear shaft 216, input planet gear 210, and output planet gear 212 and may be radially offset from axis 22 of input shaft 32. Planet gear shaft 216 is supported or rotatably coupled at a first end by a flange member 218 of compound gear set 200.

Figure 5:
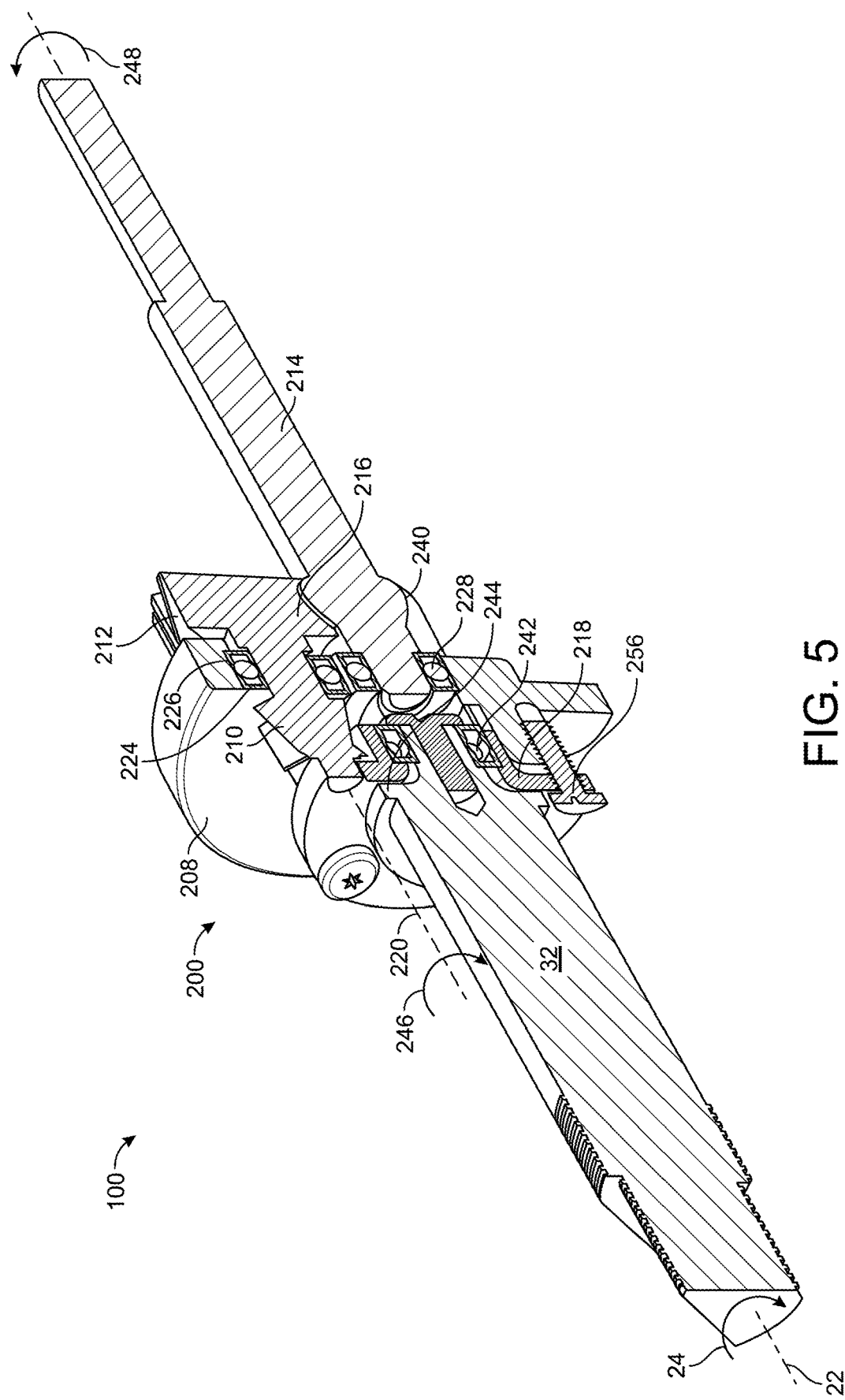
FIG. 5 is a perspective sectional view of a compound gear set that receives an input torque from a handle and outputs torque to a spool of the baitcaster of FIG. 1, according to an exemplary embodiment.
Figure 6:
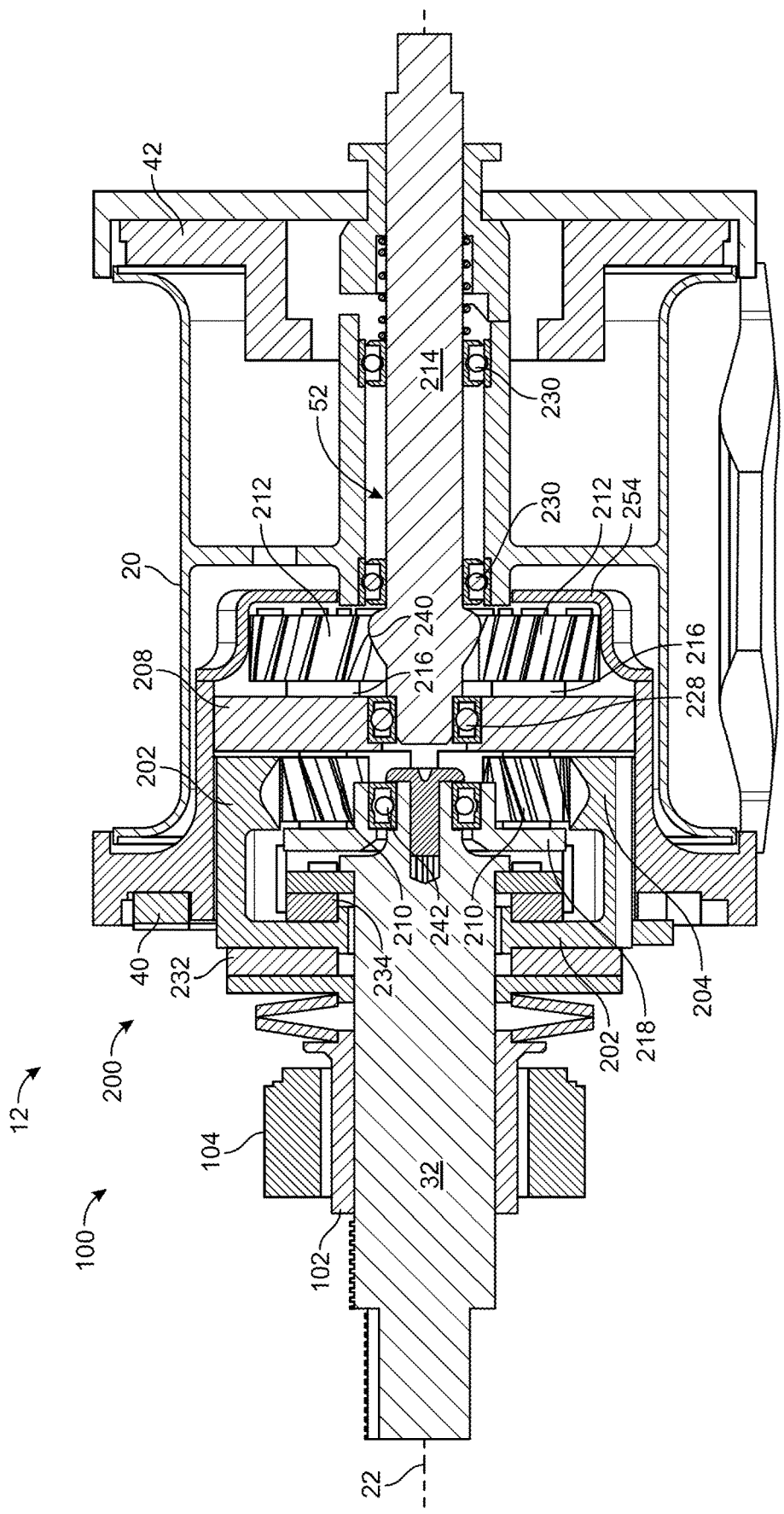
FIG. 6 is a sectional view of the baitcaster of FIG. 1, according to an exemplary embodiment.
Figure 7:
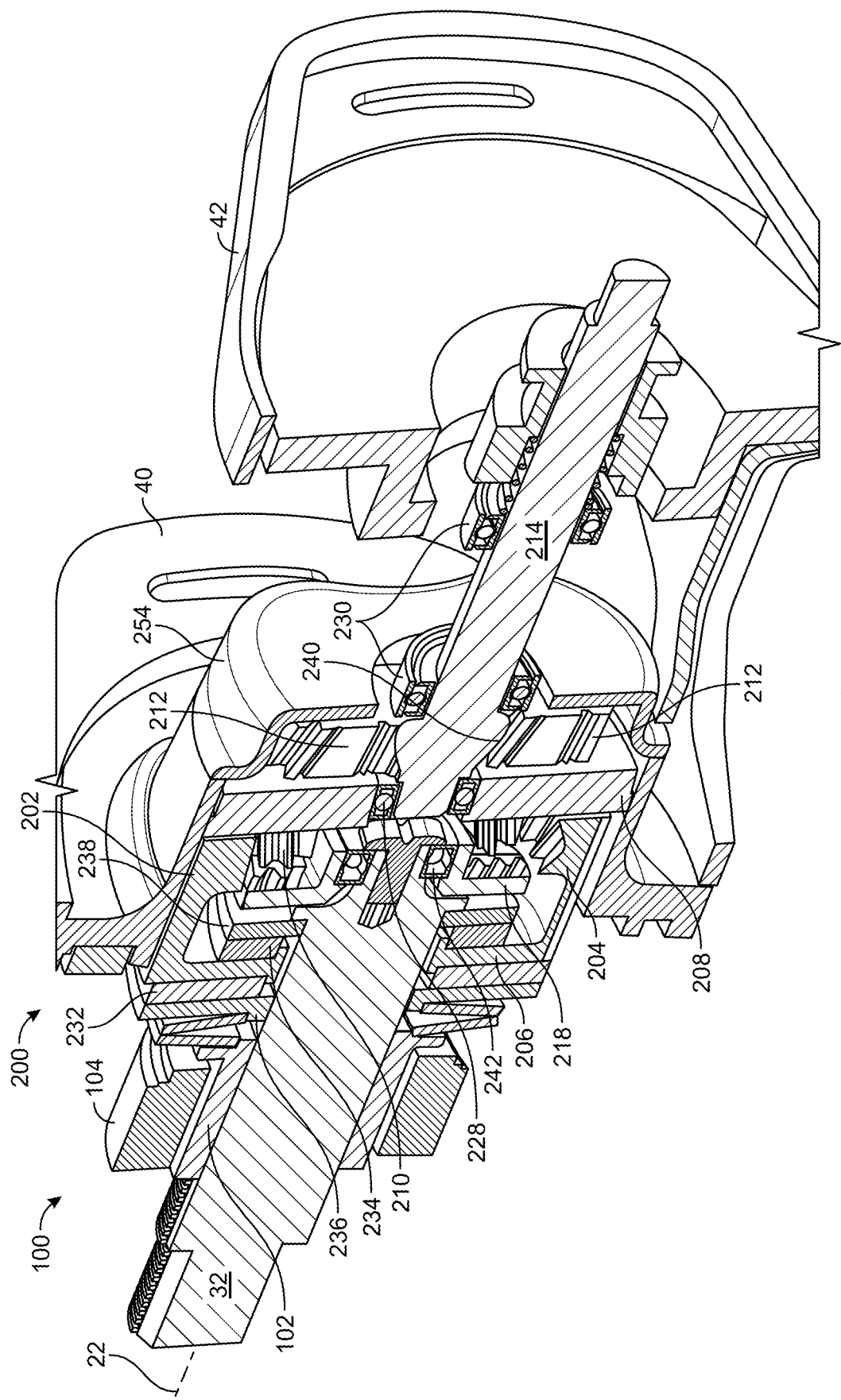
FIG. 7 is a perspective sectional view of the baitcaster of FIG. 1, according to an exemplary embodiment.

As shown in FIG. 5, carrier 208 can be bolted or otherwise fixedly coupled with flange member 218 (e.g., a retaining member) through fasteners 256 or fixedly coupled with any other retaining member. In some embodiments, carrier 208 is press fit into first structural member 40. The retaining member may include an aperture, a hole, an inner volume, recesses (e.g., recesses 258 shown in FIG. 9), etc., configured to receive a push-shaft for pressing carrier 208 into first structural member 40 and to prevent tipping of central bearing 228.

Input shaft 32 includes a first or proximate end where handle 36 is coupled with input shaft 32, and a second or distal end that is opposite the first end. Flange member 218 is rotatably coupled with input shaft 32 at the second or distal end. Flange member 218 is co-axial with axis 22 and may be free to rotate relative to input shaft 32. Flange member 218 may be configured to rotatably couple with the second end of input shaft 32 through input shaft bearing 242. Input shaft bearing 242 can include an inner race and an outer race. The outer race of input shaft bearing 242 can be fixedly coupled with a corresponding radially inwards facing surface of flange member 218. The inner race of input shaft bearing 242 can be fixedly coupled with a corresponding radially outwards facing surface of input shaft 32 at the second end of input shaft 32.

Flange member 218 is configured to rotatably couple with an end of planet gear shafts 216. In some embodiments, an end portion of planet gear shafts 216 or a protrusion of input planet gears 210 extends through a corresponding aperture of flange member 218. In this way, planet gear shafts 216 and/or input planet gears 210 may rotatably couple with flange member 218. In some embodiments, planet gear shafts 216 and input planet gears 210 are free to rotate about their axis 220 relative to flange member 218.

Input shaft 32 is configured to drive ring member 202 which engages and drives input planet gears 210. Input shaft 32 may rotate about axis 22, thereby driving ring member 202 to rotate about axis 22. Rotation of ring member 202 about axis 22 drives each set of input planet gear 210, planet gear shaft 216, and output planet gear 212 to spin about their respective axes 220. Input planet gears 210, planet gear shafts 216, and output planet gears 212 may each be driven to spin about their respective axes 220, by the engagement between teeth of input planet gears 210 and radially inwards facing teeth of ring member 202. In some embodiments, input planet gears 210, planet gear shafts 216, and output planet gears 212 spin about their respective axes 220 without orbiting about axis 22. For example, axes 220 may be translationally fixed relative to carrier 208 so that each assembly of input planet gear 210, planet gear shaft 216, and output planet gear 212 spin about axis 220 while axis 220 remains stationary.

Carrier 208 can be fixedly coupled with first structural member 40, first body member 28, or any other stationary structural or housing component of reel 12. Spinning of planet gear shafts 216 and input planet gears 210 about their respective axes 220 drives rotation of output planet gears 212 which engage, mesh, or otherwise interface with teeth 240 of output shaft 214. In some embodiments, output planet gears 212 have a larger number of teeth with respect to input planet gears 210 such that rotation of input shaft 32 at a first speed results in rotation of output shaft 214 at a second speed that is higher than the first speed. Output shaft 214 can be rotatably coupled with carrier 208 through a central bearing 228. For example, a radially outwards facing surface of output shaft 214 may be fixedly coupled with a radially inwards facing surface of an inner race of central bearing 228. A radially outwards facing surface of an outer race of central bearing 228 can be fixedly coupled (e.g., press fit, interference fit, slip fit, etc.) with a radially inwards facing surface of carrier 208.

In this way, turning input shaft 32 (e.g., by rotating handle 36) drives rotation of output shaft 214. Output shaft 214 can be fixedly coupled with spool 20 such that rotation of output shaft 214 about axis 22 drives rotation of spool 20 about axis 22. In some embodiments, output shaft 214 is selectably fixedly coupled with spool 20. Spool 20 can include an inner volume 52 through which output shaft 214 extends. In some embodiments, spool 20 and output shaft 214 are rotatably coupled with each other through spool bearings 230. A radially outwards facing surface of an outer race of spool bearings 230 is fixedly coupled or otherwise coupled with a radially inwards facing surface of spool 20. A radially inwards facing surface of an inner race of spool bearings 230 is fixedly coupled (e.g., press fit, keyed, etc.) with a radially outwards facing surface of output shaft 214.

Spool 20 can include a central member, a cylindrical member, a central sleeve, etc., shown as spool shaft 250. Spool shaft 250 may be a hollow cylindrical member that is integrally formed with spool 20. Spool shaft 250 includes a radially inwards facing surface 252 and may extend longitudinally along axis 22. Surface 252 may engage, abut, interface with, fixedly couple with, etc., a radially outwards facing surface of the outer race of spool bearings 230.

Ring member 202 may be fixedly rotatably coupled with input shaft 32 through a first frictional member 232 and a second frictional member 234. First frictional member 232 and second frictional member 234 are configured to engage, abut, contact, etc., opposite sides of engagement portion 206 of ring member 202 to fixedly couple ring member 202 with input shaft 32. First frictional member 232 may abut, contact, engage, etc., a first annular member, a first engagement member, a connecting member, etc., shown as first engagement member 236. Second frictional member 234 may abut, contact, engage, etc., a second annular member, a second engagement member, a connecting member, etc., shown as second engagement member 238. First engagement member 236 and second engagement member 238 may be rotatably fixedly coupled with input shaft 32 (e.g., through a keyed interface, a spline connection, flats that interface with input shaft 32, etc).

As input shaft 32 is turned (e.g., by the fisherman's hand), rotational kinetic energy is transferred from input shaft 32 to ring member 202 through the frictional engagement between frictional members 232 and 234 and engagement portion 206 of ring member 202. Ring member 202 then rotates with input shaft 32 and drives input planet gears 210 to spin. Input planet gears 210 spin about their respective axes 220, thereby driving planet gear shaft 216 to spin and driving output planet gear 212 to spin. Output planet gears 212 engage teeth 240 of output shaft 214 so that spinning of output planet gears 212 drives rotation of output shaft 214.

Figure 4:
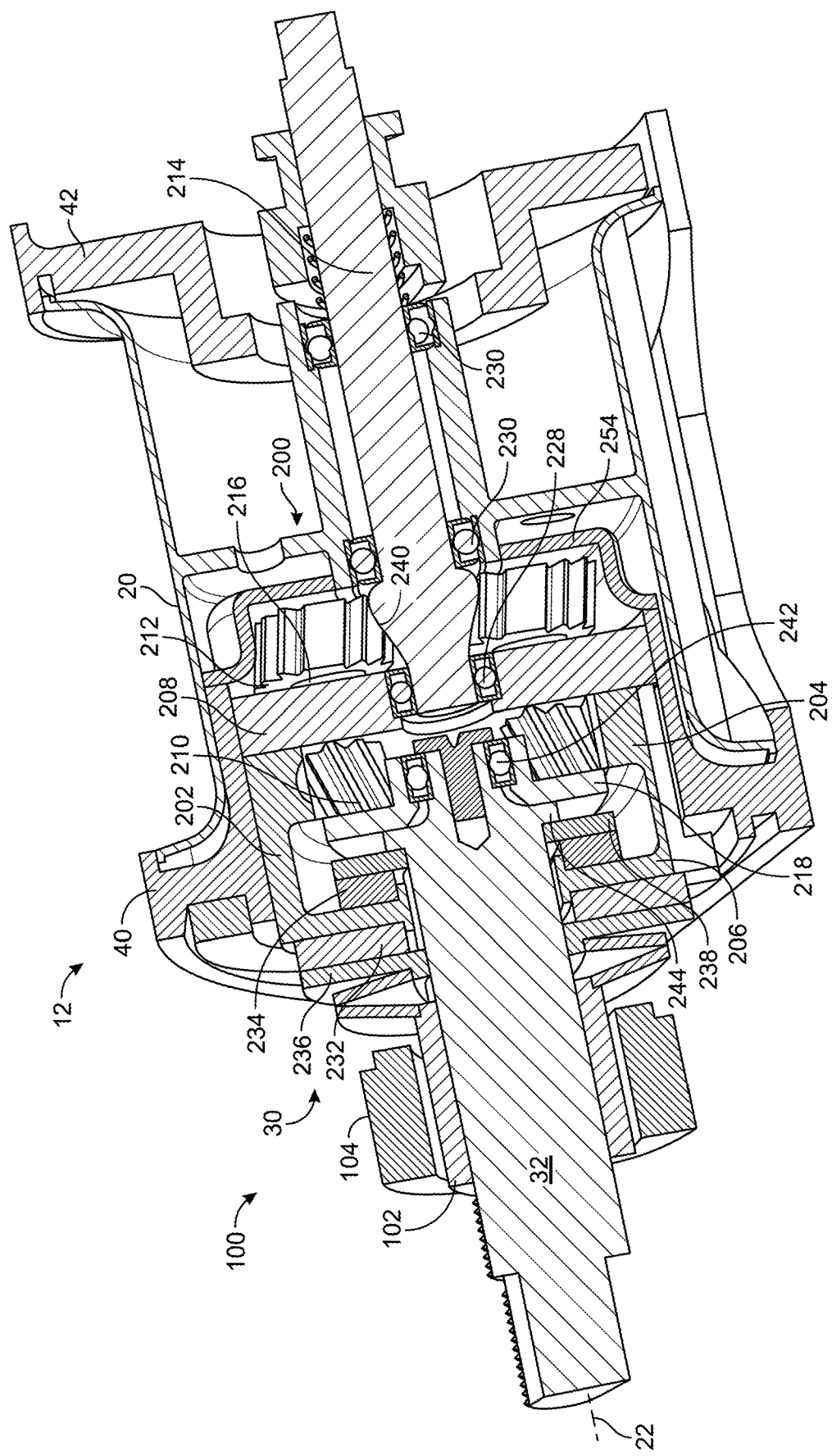
FIG. 4 is a sectional view of the spool drive mechanism of the baitcaster of FIG. 3, according to an exemplary embodiment.

Referring particularly to FIGS. 3-5, input shaft 32 can include a step, a shoulder, an annular protrusion, etc., shown as annular protrusion 244. Annular protrusion 244 is configured to engage second engagement member 238.

Referring particularly to FIGS. 3-8 and 11, spool drive mechanism 100 can include a collar, a sleeve, an annular member, etc., shown as collar 102. Spool drive mechanism 100 can also include a one-way bearing, a sprag clutch, a sprag bearing, a trapped bearing, etc., shown as one-way bearing 104. One-way bearing 104 may facilitate or allow rotation of input shaft 32 in direction 24 about axis 22 but prevent, restrict, or facilitate preventing rotation of input shaft 32 about axis 22 in a direction opposite direction 24.

One-way bearing 104 can be rotatably coupled with collar 102 so that one-way bearing 104 is supported by collar 102 on input shaft 32. Collar 102 may be rotatably fixedly coupled with input shaft 32 (e.g., keyed) such that collar 102 rotates or turns with input shaft 32. In some embodiments, one-way bearing 104 is fixedly rotatably coupled with first body member 28 so that first body member 28 can provide reactionary force to input shaft 32 through one-way bearing 104 and collar 102 to prevent or facilitate preventing turning input shaft 32 in a direction opposite direction 24.

When input shaft 32 is turned in direction 24, input shaft 32 drives ring member 202 which spins input planet gears 210 about their respective axes 220. Input planet gears 210 drive planet gear shafts 216 and output planet gears 212 to spin about axes 220. Output planet gears 212 then drive output shaft 214 to rotate about axis 22. One-way bearing 104 may allow turning of input shaft 32 in direction 24. Turning input shaft 32 in direction 24 drives input planet gears 210, planet gear shafts 216, and output planet gears 212 to spin about their respective axes 220 in direction 246. Spinning of input planet gears 210, planet gear shafts 216, and output planet gears 212 about axes 220 in direction 246 drives rotation of output shaft 214 in direction 248 about axis 22. Spool 20 may be rotatably fixedly coupled with output shaft 214 so that spool 20 rotates in direction 248 about axis 22 in unison with rotation of output shaft 214. In some embodiments, spool 20 and output shaft 214 rotate in direction 248 so that fishing line 26 is taken up or wound onto spool 20.

Spool 20 and output shaft 214 may be prevented from rotating in a direction about axis 22 that is opposite direction 248. If spool 20 and output shaft 214 are driven to rotate in a direction that is opposite direction 248, torque may be transferred through spool 20, output shaft 214, output planet gears 212, planet gear shafts 216, input planet gears 210, ring member 202, and input shaft 32. One-way bearing 104 may prevent rotation of back-driving of spool 20 and output shaft 214. In some embodiments, spool 20 and output shaft 214 are selectably coupled such that spool 20 may be free to rotate relative to output shaft 214 (e.g., during let-out of fishing line 26), thereby de-coupling spool 20 from one-way bearing 104.

Figure 8:
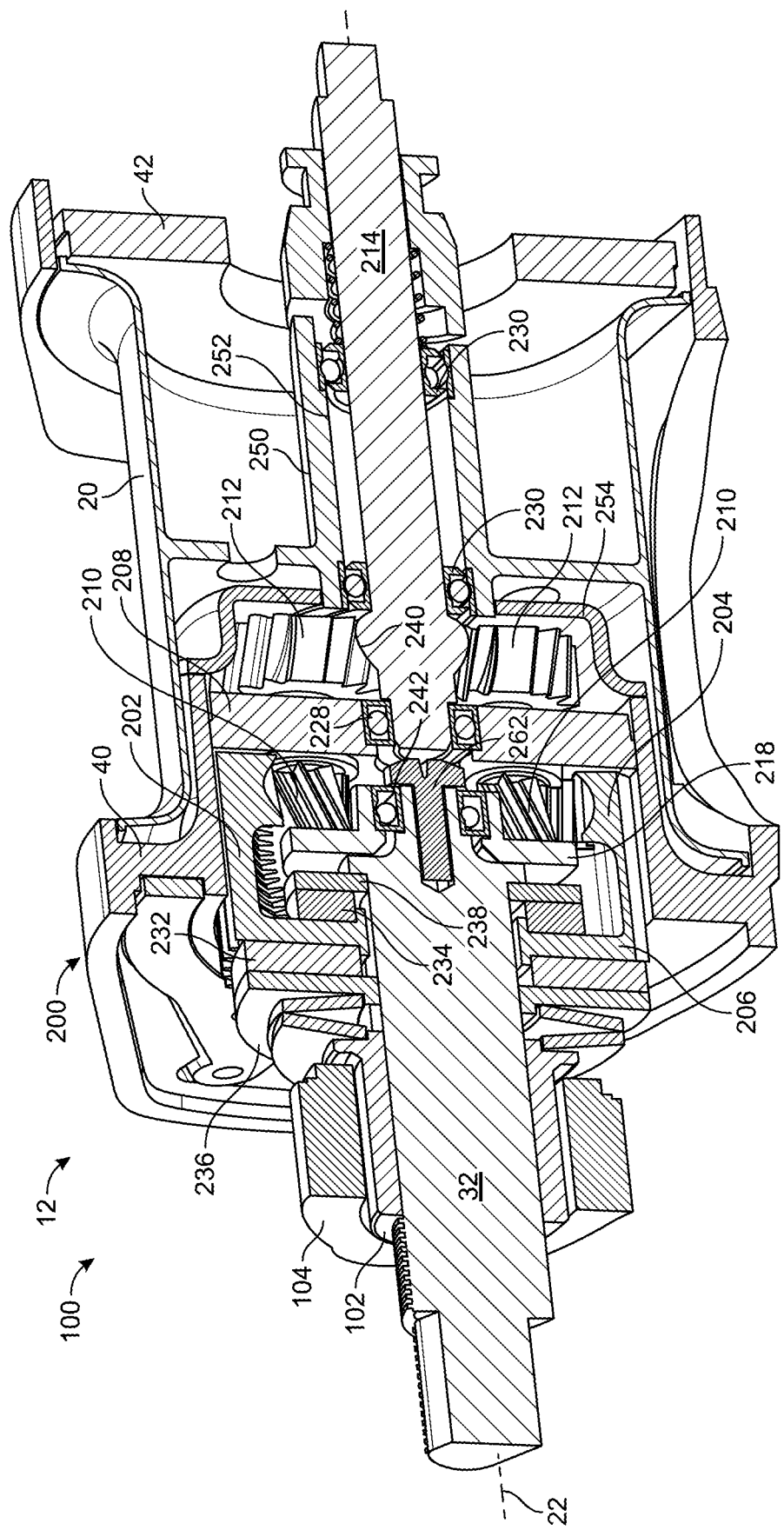
FIG. 8 is a perspective sectional view of the baitcaster of FIG. 1, according to an exemplary embodiment.
Figure 9:
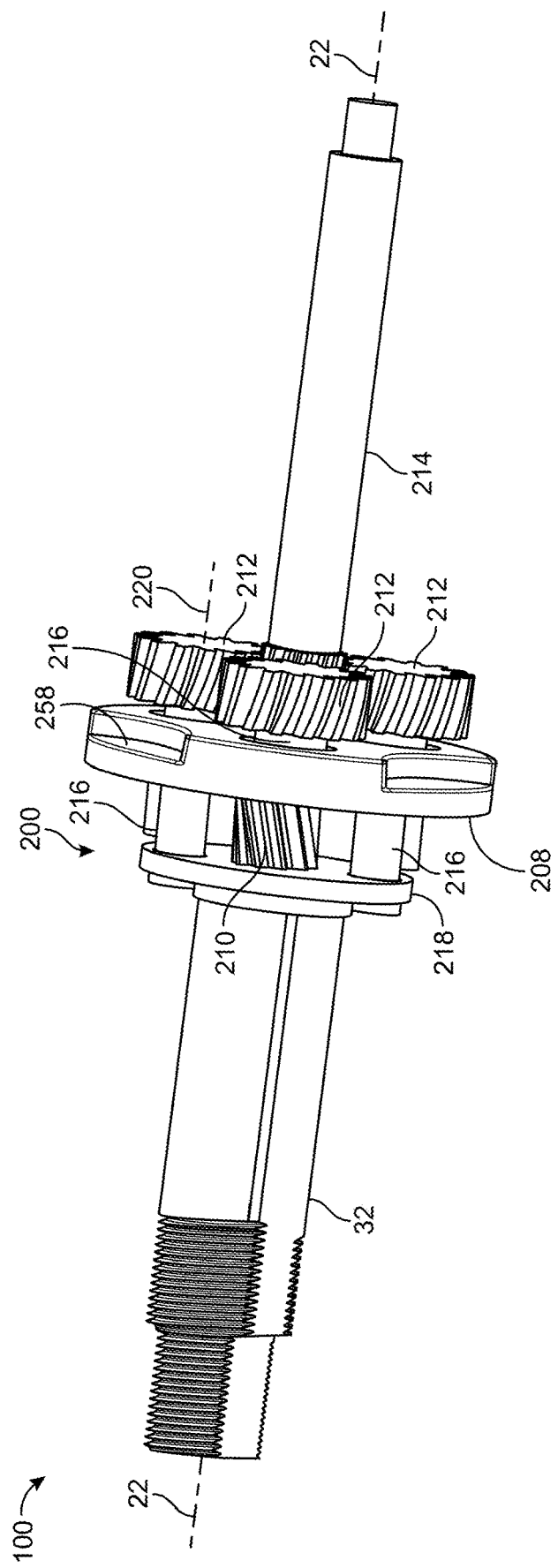
FIG. 9 is a perspective view of the compound gear set of FIG. 5, according to an exemplary embodiment.
Figure 10:
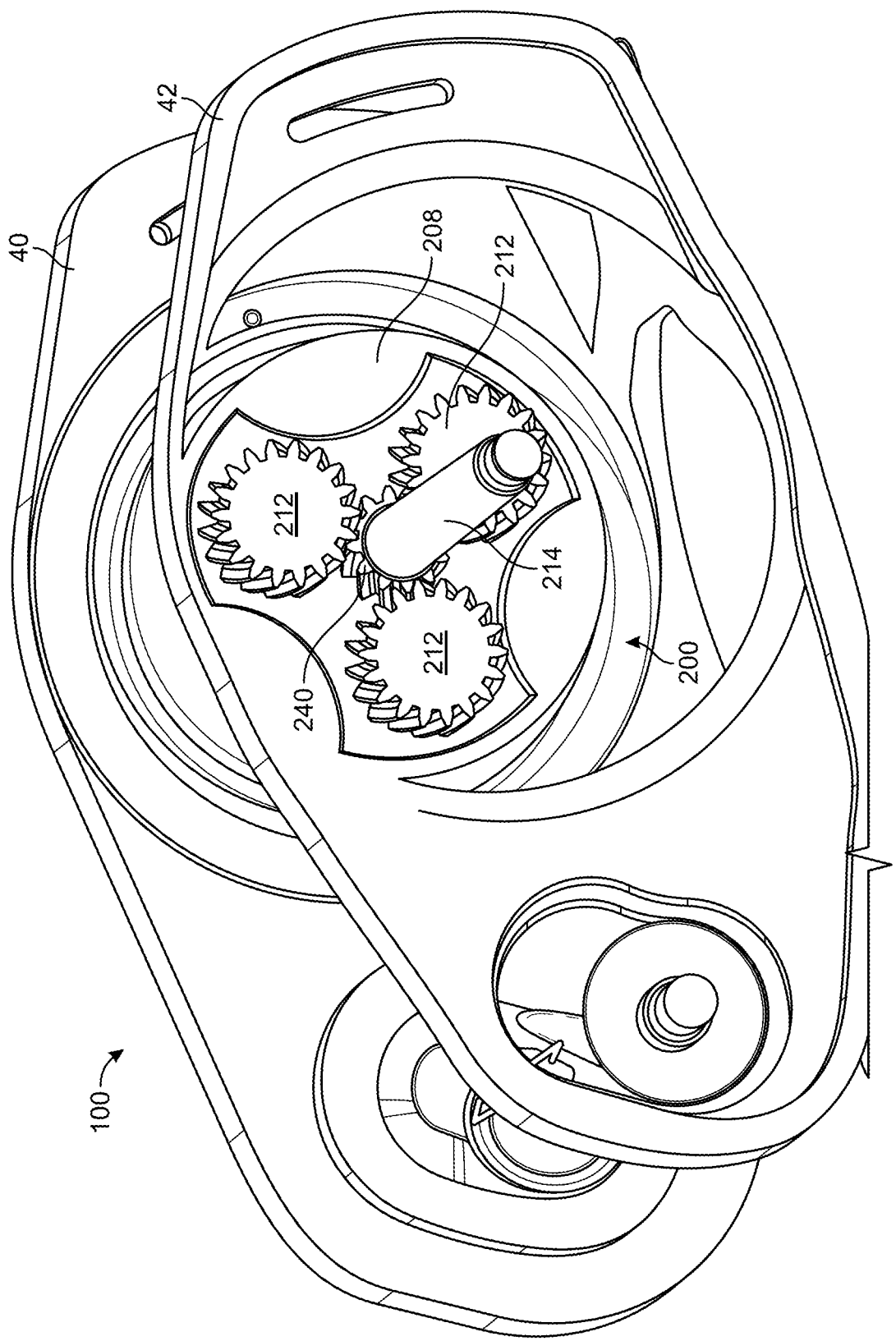
FIG. 10 is a perspective view of a portion of the baitcaster of FIG. 1, according to an exemplary embodiment.
Figure 11:
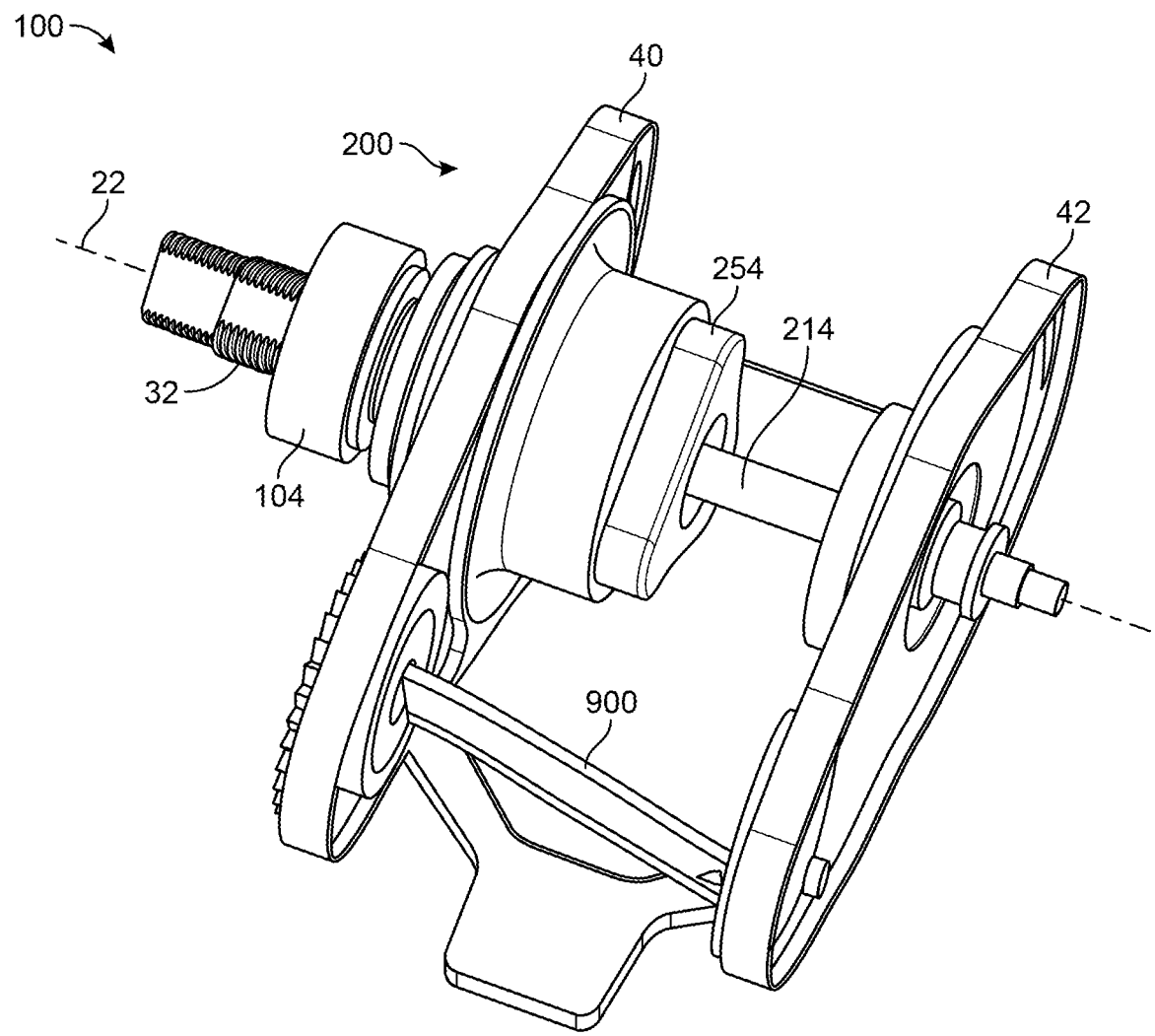
FIG. 11 is a perspective view of a portion of the baitcaster of FIG. 1, according to an exemplary embodiment.
Figure 13:
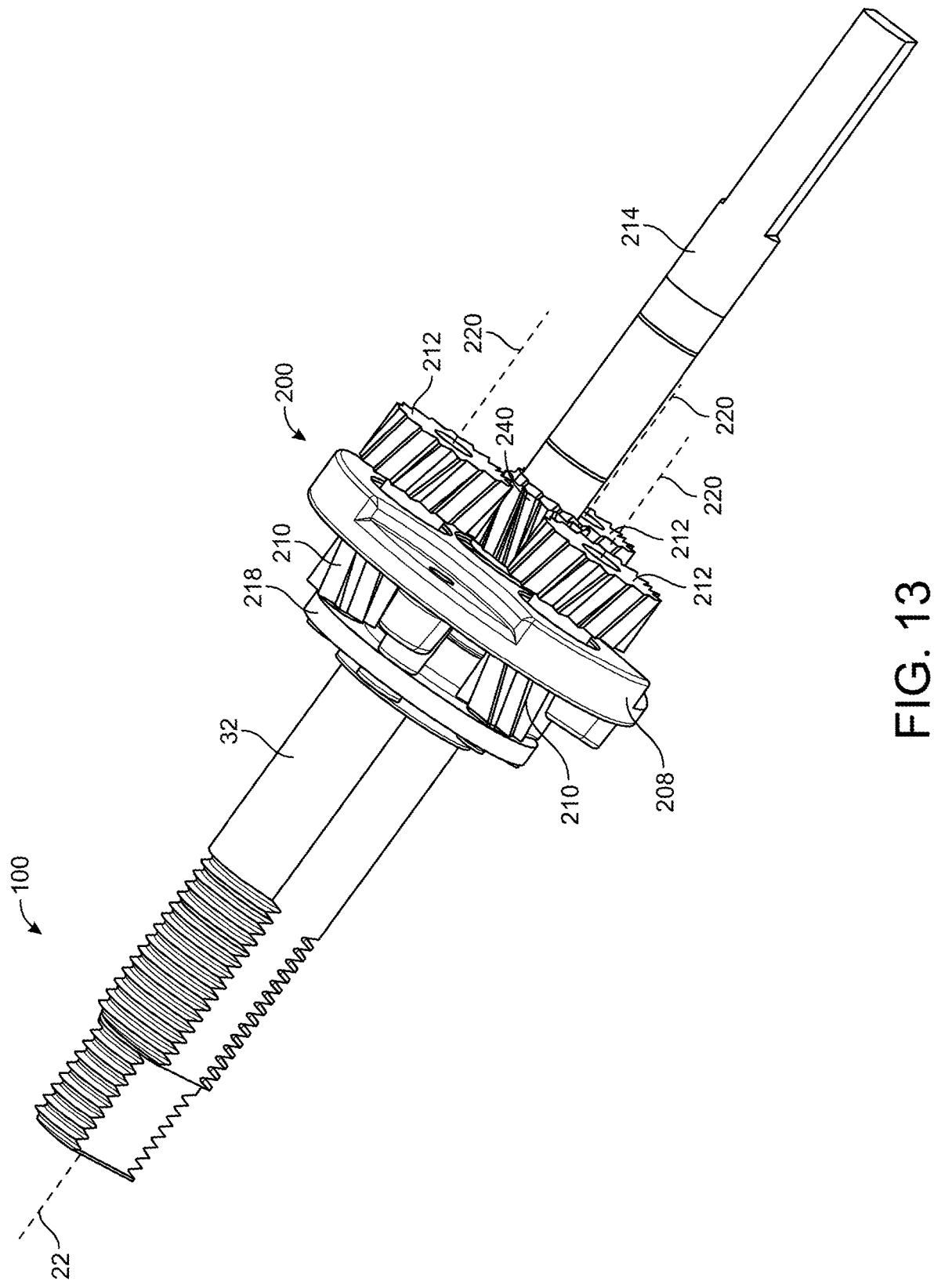
FIG. 13 is a perspective view of the compound gear set of FIG. 5, according to an exemplary embodiment.
Figure 14:
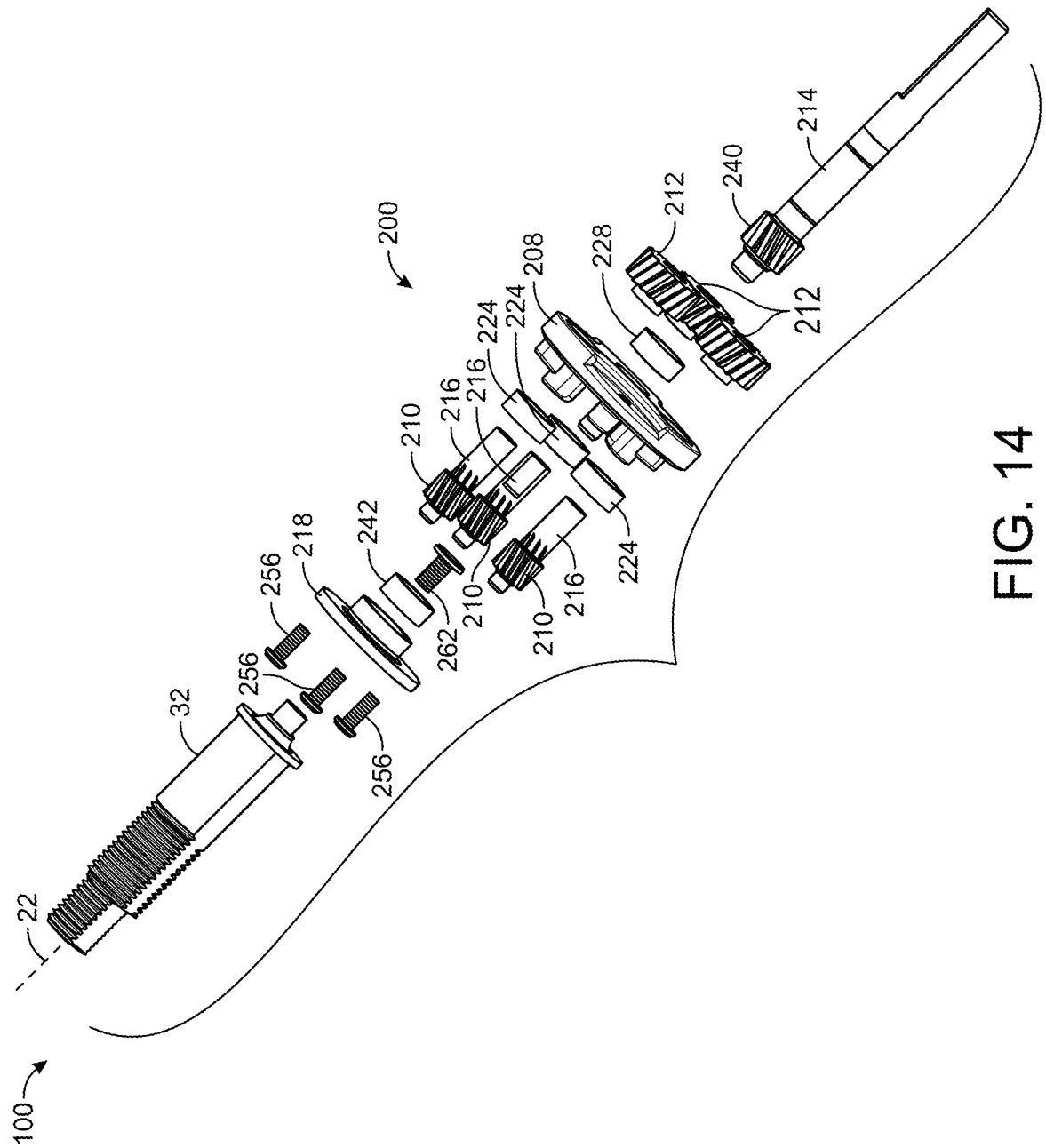
FIG. 14 is an exploded perspective view of the compound gear set of FIG. 5, according to an exemplary embodiment.

Referring particularly to FIGS. 8 and 13-14, flange member 218 can be rotatably coupled with carrier 208 through fasteners 256 that extend through flange member 218. In some embodiments, three fasteners 256 are used to translationally and/or rotatably fixedly couple flange member 218 with carrier 208. In some embodiments, flange member 218 is fixedly coupled (e.g., rotatably and/or translationally) with input shaft 32 through a fastener 262 that extends through a central portion (e.g., a central aperture, a through hole, etc.) of flange member 218 and threadingly couples with input shaft 32.

Figure 12:
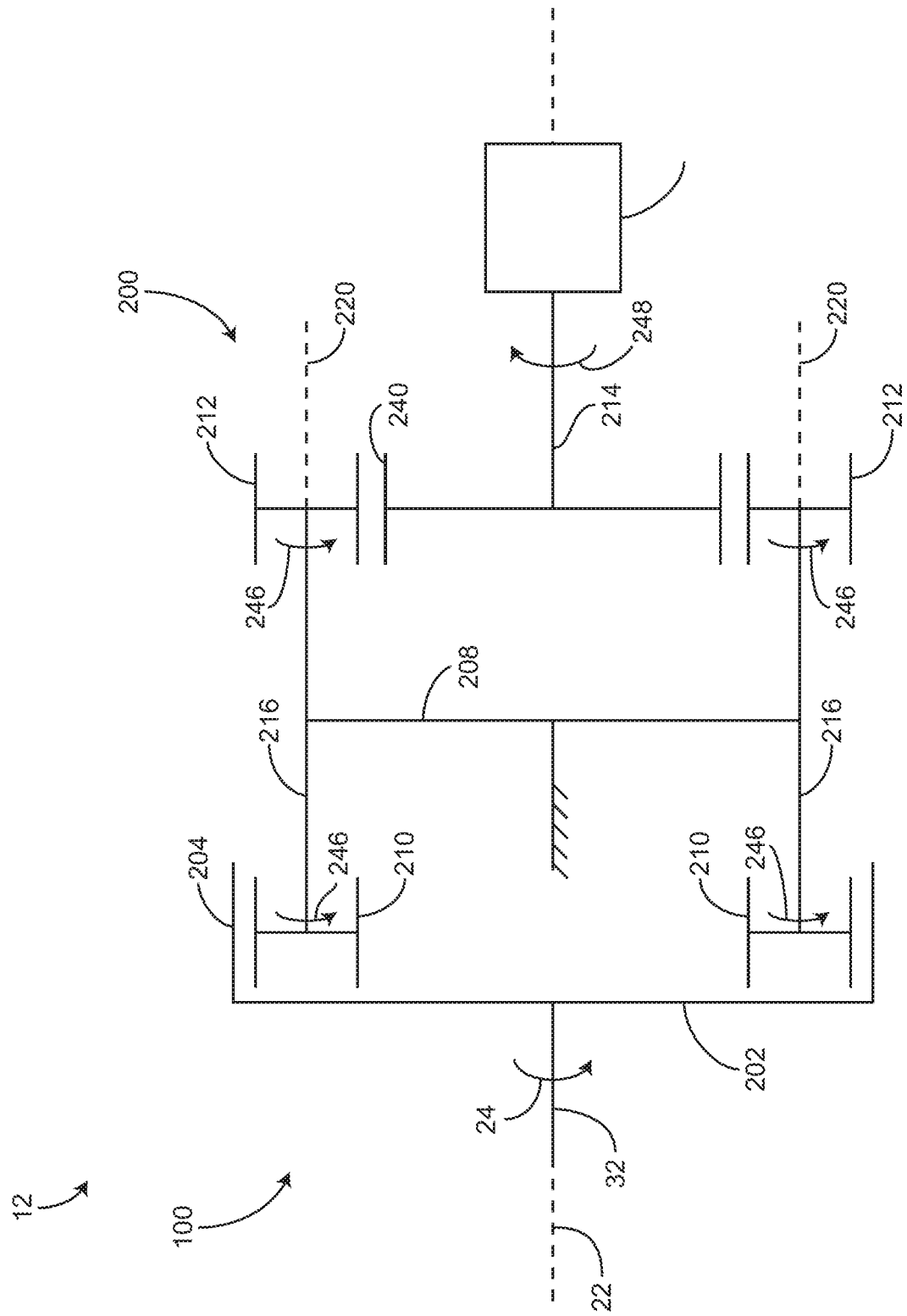
FIG. 12 is a schematic diagram of the compound gear set of FIG. 5, according to an exemplary embodiment.

Referring particularly to FIG. 12, a schematic diagram of compound gear set 200 is shown, according to an exemplary embodiment. Compound gear set 200 receives rotational kinetic energy from input shaft 32 (e.g., in direction 24) and transfers the rotational kinetic energy to input planet gears 210 such that input planet gears 210 spin about their respective axes 220 in direction 246. Compound gear set 200 may transfer the rotational kinetic energy from input shaft 32 to input planet gears 210 to spin input planet gears 210 about axes 220 in direction 246. Input planet gears 210 can rotate about axis 220 while being fixedly coupled with carrier 208. Carrier 208 is fixedly rotatably coupled such that axes 220 do not rotate relative to axis 22 (e.g., such that input planet gears 210, planet gear shafts 216, and output planet gears 212 do not orbit axis 22). Input planet gears 210, planet gear shafts 216, and output planet gears 212 rotate or spin about axes 220 and drive output shaft 214 through the interface or engagement between output planet gears 212 and teeth 240 of output shaft 214. Output shaft 214 may be rotatably fixedly coupled with spool 20 so that spool 20 rotates about axis 22. Spool 20, output shaft 214, and input shaft 32 may all be co-axial with each other (e.g., about axis 22).

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A baitcaster for retrieving a fishing line, the baitcaster comprising:
   a spool configured to be driven to take up the fishing line;
   a compound gear set comprising:
      a ring gear configured to receive a torque from a first shaft;
      a plurality of first planet gears each mounted on one of a plurality of planet gear shafts and configured to be driven by the ring gear;
      a flange member comprising a plurality of openings configured to receive ends of the plurality of planet gear shafts;
      a plurality of second planet gears driven by the plurality of first planet gears;
      a second shaft driven by the plurality of second planet gears and configured to drive the spool to take up the fishing line; and
      a bearing comprising an outer race configured to fixedly couple with a radially inwards facing surface of the flange member and an inner race configured to fixedly couple with the first shaft;
      wherein a distal end of the first shaft terminates at a first location within an inner volume of the spool and a first end of the second shaft begins at a second location within the inner volume of the spool.

2. The baitcaster of claim 1, wherein the ring gear comprises a plurality of radially inwards facing teeth configured to engage teeth of the plurality of first planet gears.

3. The baitcaster of claim 1, wherein the ring gear is rotatably coupled with the first shaft through a frictional engagement.

4. The baitcaster of claim 1, wherein the compound gear set further comprises a carrier, wherein the second shaft is supported by the carrier and rotationally free relative to the carrier.

5. The baitcaster of claim 4, wherein each of the plurality of second planet gears is fixedly coupled with a corresponding one of the plurality of planet gear shafts.

6. The baitcaster of claim 5, wherein the carrier comprises a plurality of bearings, each of the plurality of bearings configured to receive a corresponding one of the plurality of planet gear shafts and coupled with a corresponding bore of the carrier, wherein the plurality of planet gear shafts extend through or partially into the carrier and are supported by the carrier.

7. The baitcaster of claim 1, wherein the plurality of second planet gears each have a number of teeth that is greater than a number of teeth of each of the plurality of first planet gears.

8. The baitcaster of claim 1, wherein the plurality of first planet gears and the plurality of second planet gears are helical gears.

9. The baitcaster of claim 1, wherein the first shaft and the second shaft are co-axial with each other, wherein the first shaft is configured to rotate in a first direction to drive the second shaft to rotate in a second direction that is opposite the first direction.

10. A compound gear set for a fishing reel, the compound gear set comprising:
a ring gear configured to receive an input torque from an input shaft;
a plurality of input planet gears each mounted on one of a plurality of planet gear shafts and configured to be driven by the ring gear;
a flange member comprising a plurality of openings configured to receive ends of the plurality of planet gear shafts;
a plurality of output planet gears driven by the plurality of input planet gears;
an output shaft driven by the plurality of output planet gears and configured to drive a spool to take up fishing line; and
a bearing comprising an outer race configured to fixedly couple with a radially inwards facing surface of the flange member and an inner race configured to fixedly couple with the input shaft;
wherein a distal end of the input shaft terminates at a first location within an inner volume of the spool and a first end of the output shaft begins at a second location within the inner volume of the spool.

11. The compound gear set of claim 10, wherein the ring gear comprises a plurality of radially inwards facing teeth configured to engage teeth of the plurality of input planet gears.

12. The compound gear set of claim 10, wherein the ring gear is rotatably coupled with the input shaft through a frictional engagement.

13. The compound gear set of claim 10, wherein the compound gear set further comprises a carrier, wherein the output shaft is supported by the carrier and rotationally free relative to the carrier.

14. The compound gear set of claim 13 wherein each of the plurality of output planet gears is fixedly coupled with a corresponding one of the plurality of planet gear shafts.

15. The compound gear set of claim 14, wherein the carrier comprises a plurality of bearings, each of the plurality of bearings configured to receive a corresponding one of the plurality of planet gear shafts and coupled with a corresponding bore of the carrier, wherein the plurality of planet gear shafts extend through or partially into the carrier and are supported by the carrier.

16. The compound gear set of claim 10, wherein the plurality of output planet gears each have a number of teeth that is greater than a number of teeth of each of the plurality of input planet gears.

17. The compound gear set of claim 10, wherein the plurality of input planet gears and the plurality of output planet gears are helical gears.

18. The compound gear set of claim 10, wherein the input shaft and the output shaft are co-axial with each other, wherein the input shaft is configured to rotate in a first direction to drive the output shaft to rotate in a second direction that is opposite the first direction.

19. A gear set for driving a spool of a baitcaster, the gear set comprising:
an input shaft configured to be driven by a handle about a shaft axis;
a plurality of planet gear shafts radially offset from the shaft axis, each defining an axis and configured to be driven to rotate about the axis;
a plurality of input planet gears, each fixedly coupled with a corresponding one of the plurality of planet gear shafts, the plurality of input planet gears configured to be driven to rotate by the input shaft;
a flange member comprising a plurality of openings configured to receive ends of the plurality of planet gear shafts;
a plurality of output planet gears, each fixedly coupled with a corresponding one of the plurality of planet gear shafts, the plurality of output planet gears configured to drive an output shaft of the baitcaster; and
a bearing comprising an outer race configured to fixedly couple with a radially inwards facing surface of the flange member and an inner race configured to fixedly couple with the input shaft;
wherein a distal end of the input shaft terminates at a first location within an inner volume of the spool and a first end of the output shaft begins at a second location within the inner volume of the spool.

20. The gear set of claim 19, wherein the output shaft comprises a plurality of teeth configured to engage the plurality of output planet gears to drive the spool to take up fishing line.

* * * * *